United States Patent
Kodera et al.

(10) Patent No.: US 12,375,377 B2
(45) Date of Patent: Jul. 29, 2025

(54) COMMUNICATION FAILURE DETERMINATION DEVICE

(71) Applicant: DAIKIN INDUSTRIES, LTD., Osaka (JP)

(72) Inventors: Keita Kodera, Osaka (JP); Shin Higashiyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/369,056

(22) Filed: Sep. 15, 2023

(65) Prior Publication Data
US 2024/0007372 A1 Jan. 4, 2024

Related U.S. Application Data

(63) Continuation of application No. PCT/JP2022/015695, filed on Mar. 29, 2022.

(30) Foreign Application Priority Data

Mar. 31, 2021 (JP) .............................. 2021-062239

(51) Int. Cl.
*H04L 43/0823* (2022.01)
*F24F 11/38* (2018.01)

(52) U.S. Cl.
CPC .......... *H04L 43/0823* (2013.01); *F24F 11/38* (2018.01)

(58) Field of Classification Search
CPC ............................ H04L 43/0823; F24F 11/38
USPC ....................................................... 370/252
See application file for complete search history.

(56) References Cited

U.S. PATENT DOCUMENTS

| | | | |
|---|---|---|---|
| 2007/0175268 A1* | 8/2007 | Honda | G01L 23/225 73/35.04 |
| 2013/0273936 A1* | 10/2013 | Hibara | G01S 5/0289 455/456.1 |
| 2018/0092134 A1* | 3/2018 | Ayyasamy | H04L 65/4061 |
| 2018/0309698 A1 | 10/2018 | Takahashi | |

(Continued)

FOREIGN PATENT DOCUMENTS

| | | |
|---|---|---|
| CN | 108592310 A | 9/2018 |
| CN | 110710173 A | 1/2020 |

(Continued)

OTHER PUBLICATIONS

International Preliminary Report of corresponding PCT Application No. PCT/JP2022/015695 dated Oct. 12, 2023.

(Continued)

*Primary Examiner* — Gbemileke J Onamuti
(74) *Attorney, Agent, or Firm* — GLOBAL IP COUNSELORS, LLP

(57) ABSTRACT

A communication failure determination device determines a failure of a communication line in a communication system including two or more communication devices connected in a wired manner by the communication line. The communication failure determination device includes a determination unit. The determination unit acquires communication quality information when communication is performed between the communication devices, and determines whether or not a failure occurs in the communication line based on the communication quality information. The communication devices communicate with each other at a frequency equal to or higher than 100 kHz.

18 Claims, 5 Drawing Sheets

(56) References Cited

U.S. PATENT DOCUMENTS

2019/0150005 A1* 5/2019 Cendrillon ............ H04W 24/02
                                                    370/252
2019/0165994 A1* 5/2019 Togo .................. H04L 43/0811

FOREIGN PATENT DOCUMENTS

| EP | 2712022 A1 * | 3/2014 | ............... H01Q 1/22 |
| EP | 3 379 161 A1 | 3/2018 | |
| EP | 3 793 146 A1 | 3/2021 | |
| EP | 3923148 A1 * | 12/2021 | ............. F24F 11/56 |
| JP | 2011-49835 A | 3/2011 | |
| JP | 5071151 B2 | 11/2012 | |
| JP | 5915559 B2 | 5/2016 | |
| JP | 6392093 B2 | 9/2018 | |
| JP | 2020-120324 A | 8/2020 | |
| JP | 2020-129731 A | 8/2020 | |
| JP | 3 923 148 A1 | 12/2021 | |

OTHER PUBLICATIONS

International Search Report of corresponding PCT Application No. PCT/JP2022/015695 dated Jun. 21, 2022.
European Search Report of corresponding EP Application No. 22 78 0998.5 dated Jul. 9, 2024.

* cited by examiner

COMMUNICATION FAILURE DETERMINATION DEVICE

CROSS-REFERENCE TO RELATED APPLICATIONS

This is a continuation of International Application No. PCT/JP2022/015695 filed on Mar. 29, 2022, which claims priority to Japanese Patent Application No. 2021-062239, filed on Mar. 31, 2021. The entire disclosures of these applications are incorporated by reference herein.

BACKGROUND

Technical Field

The present disclosure relates to a communication failure determination device.

Background Art

As disclosed in Japanese Patent No. 6392093, there is a technique for determining whether or not a failure occurs in a communication line in accordance with whether or not communication with each communication device included in a communication system is possible.

SUMMARY

A communication failure determination device of a first aspect is configured to determine a failure of a communication line in a communication system including two or more communication devices connected in a wired manner by the communication line. The communication failure determination device includes a determination unit. The determination unit is configured to acquire communication quality information when communication is performed between the communication devices, and determine whether or not a failure occurs in the communication line based on the communication quality information. The communication devices communicate with each other at a frequency equal to or higher than 100 kHz.

DETAILED DESCRIPTION OF EMBODIMENT(S)

(1) Overall Configuration

Figure 1:
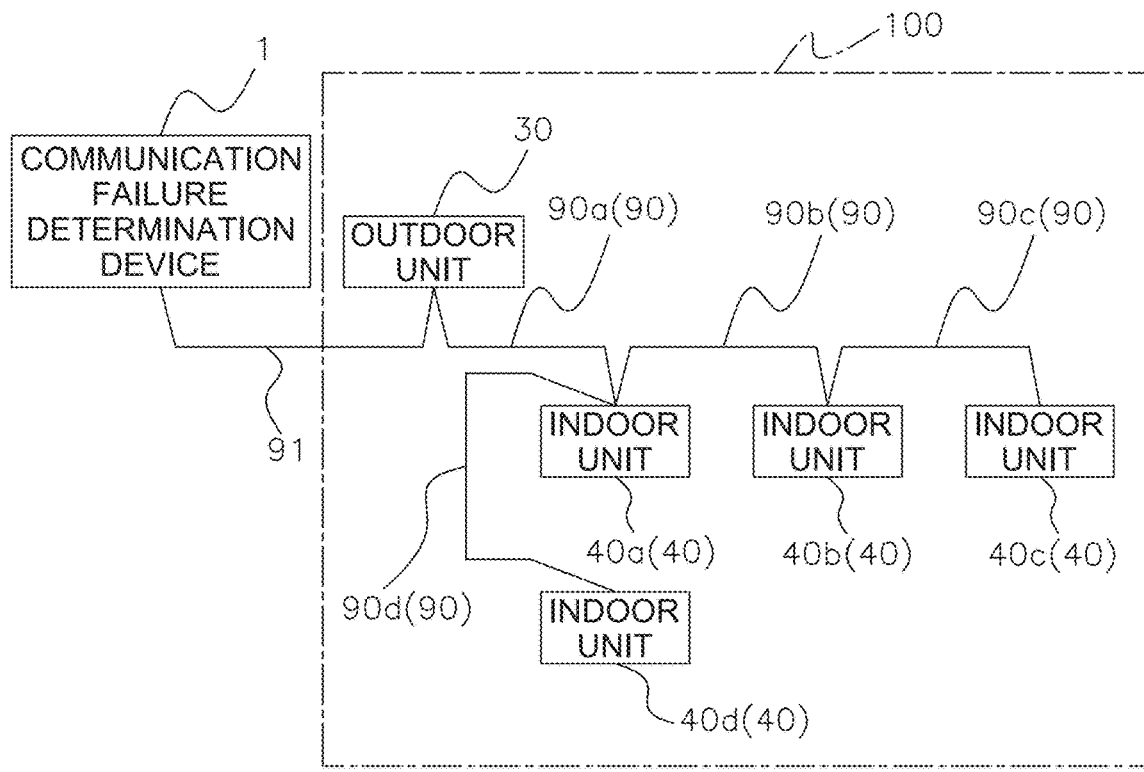
FIG. 1 is a schematic configuration diagram of a communication failure determination device and an air conditioning system.

FIG. 1 is a schematic configuration diagram of a communication failure determination device 1 and an air conditioning system 100. As illustrated in FIG. 1, the communication failure determination device 1 of the present embodiment determines a failure of communication lines 90a to 90d in the air conditioning system 100 (communication system) including an outdoor unit 30 (communication device, air conditioner) and indoor units 40a to 40d (communication device, air conditioner) connected in a wired manner by the communication lines 90a to 90d. In the present embodiment, processing of determining a failure of the communication lines 90a to 90d performed by the communication failure determination device 1 is referred to as communication failure determination processing. As illustrated in FIG. 1, the outdoor unit 30 and the indoor unit 40a are communicably connected by the communication line 90a. The indoor unit 40a and the indoor unit 40b are communicably connected by the communication line 90b. The indoor unit 40b and the indoor unit 40c are communicably connected by the communication line 90c. The indoor unit 40a and the indoor unit 40d are communicably connected by the communication line 90d. The communication failure determination device 1 is communicably connected to the outdoor unit 30 by a communication line 91. The communication failure determination device 1, the outdoor unit 30, and the indoor units 40a to 40d communicate with each other by a high-frequency signal. In the present embodiment, the high-frequency signal has a frequency equal to or higher than 100 kHz. In addition, in the present embodiment, the high-frequency signal includes a plurality of frequency-division multiplexed signals. A 2-core vinyl cabtire round cord (VCTF) is used for the communication lines 90 and 91.

Figure 2:
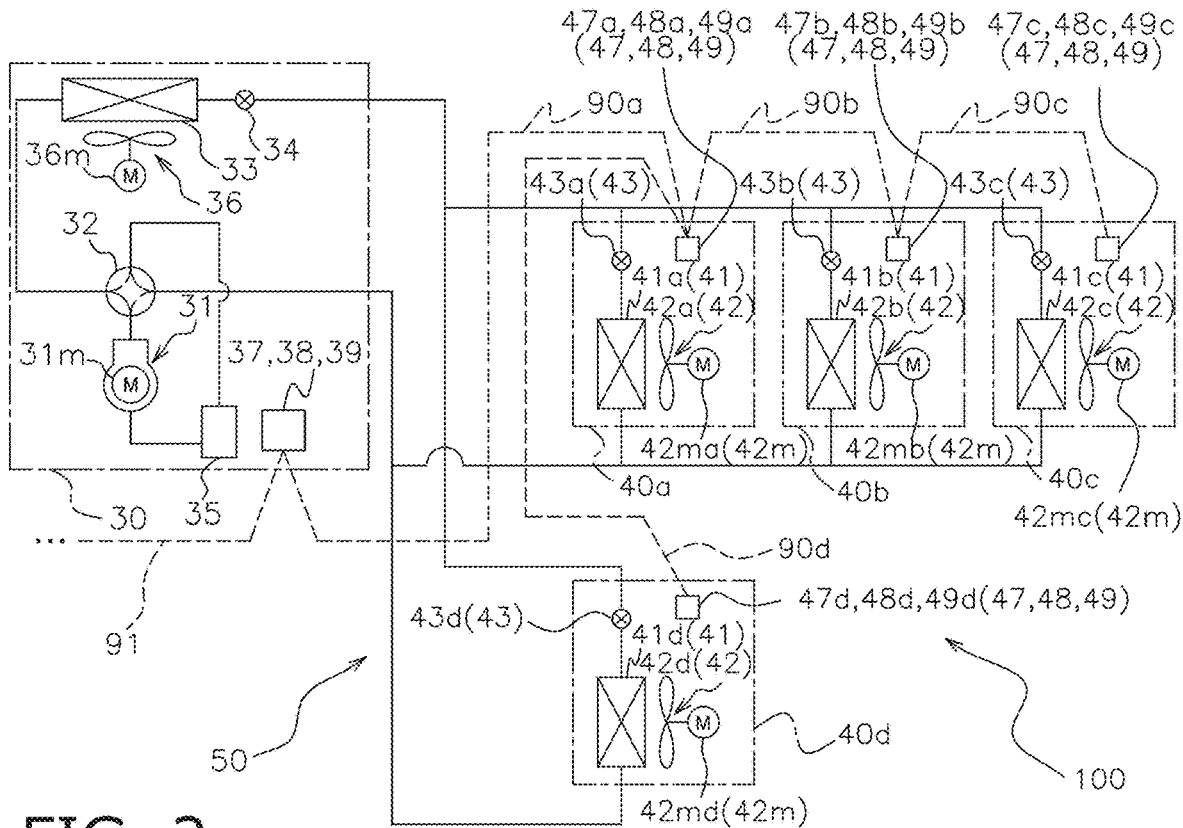
FIG. 2 is a diagram illustrating a refrigerant circuit of the air conditioning system.

The air conditioning system 100 is a system that constitutes a vapor compression refrigeration cycle and performs air conditioning such as cooling and heating on a target space. In the present embodiment, the air conditioning system 100 is a so-called multi-type air conditioning system for a building. FIG. 2 is a diagram illustrating a refrigerant circuit 50 of the air conditioning system 100. As illustrated in FIG. 2, the outdoor unit 30 and the indoor units 40a to 40d form the refrigerant circuit 50.

Hereinafter, for example, the communication lines 90a to 90d may be referred to as the communication line 90 or the like when they are not distinguished from each other. The outdoor unit 30 and the indoor unit 40 may be collectively referred to as the air conditioner 30, 40.

(2) Detailed Configuration (2-1) Indoor Unit

The indoor unit 40 is installed in a target space to be air-conditioned, such as a building room. The indoor unit 40 is, for example, a ceiling-embedded unit, a ceiling-suspended unit, or a floor-mounted unit. As illustrated in FIG. 2, the indoor units 40a to 40d mainly include indoor heat exchangers 41a to 41d, indoor fans 42a to 42d, indoor expansion valves 43a to 43d, indoor communication units 47a to 47d, indoor storage units 48a to 48d, indoor control units 49a to 49d, and various sensors (not illustrated).

(2-1-1) Indoor Heat Exchanger

The structure of the indoor heat exchanger 41 is not limited, but the indoor heat exchanger 41 is, for example, a cross-fin type fin-and-tube heat exchanger formed by a heat transfer tube (not illustrated) and a large number of fins (not illustrated). The indoor heat exchanger 41 performs heat exchange between the refrigerant flowing through the indoor heat exchanger 41 and the air in a target space.

The indoor heat exchanger 41 functions as an evaporator during the cooling operation, and functions as a condenser during the heating operation.

(2-1-2) Indoor Fan

The indoor fan 42 sucks air in a target space into the indoor unit 40, supplies the air to the indoor heat exchanger 41, and supplies the indoor air heat-exchanged with the refrigerant in the indoor heat exchanger 41 to the target space. The indoor fan 42 is, for example, a centrifugal fan such as a turbo fan or a sirocco fan. The indoor fans 42a to 42d are driven by indoor fan motors 42ma to 42md. The number of rotations of the indoor fan motor 42m can be controlled by an inverter.

(2-1-3) Indoor Expansion Valve

The indoor expansion valve 43 is a mechanism for adjusting the pressure and flow rate of the refrigerant flowing through refrigerant pipes. In the present embodiment, the indoor expansion valve 43 is an electronic expansion valve whose opening degree is adjustable.

(2-1-4) Indoor Communication Unit

The indoor communication unit 47 is a network interface device for communicating with the communication failure determination device 1, the outdoor unit 30, and the other indoor units 40. A communication address of the indoor communication unit 47 is set in the indoor communication unit 47, for example, when the construction of the air conditioning system 100 is completed. The indoor communication unit 47 is configured to communicate with the communication failure determination device 1, the outdoor unit 30, and the other indoor units 40 by a high-frequency signal.

(2-1-5) Indoor Storage Unit

The indoor storage unit 48 is a storage device such as a RAM, a ROM, and a hard disk drive (HDD). The indoor storage unit 48 stores a program executed by the indoor control unit 49, data necessary for the execution of the program, and the like.

(2-1-6) Indoor Control Unit

The indoor control unit 49 is a processor such as a CPU or a GPU. The indoor control unit 49 reads a program stored in the indoor storage unit 48, and performs predetermined arithmetic processing in accordance with the program, thereby controlling the operation of each part forming the indoor unit 40. In addition, the indoor control unit 49 can write a calculation result in the indoor storage unit 48 and read information stored in the indoor storage unit 48 in accordance with a program. Further, the indoor control unit 49 includes a timer.

Figure 3A:
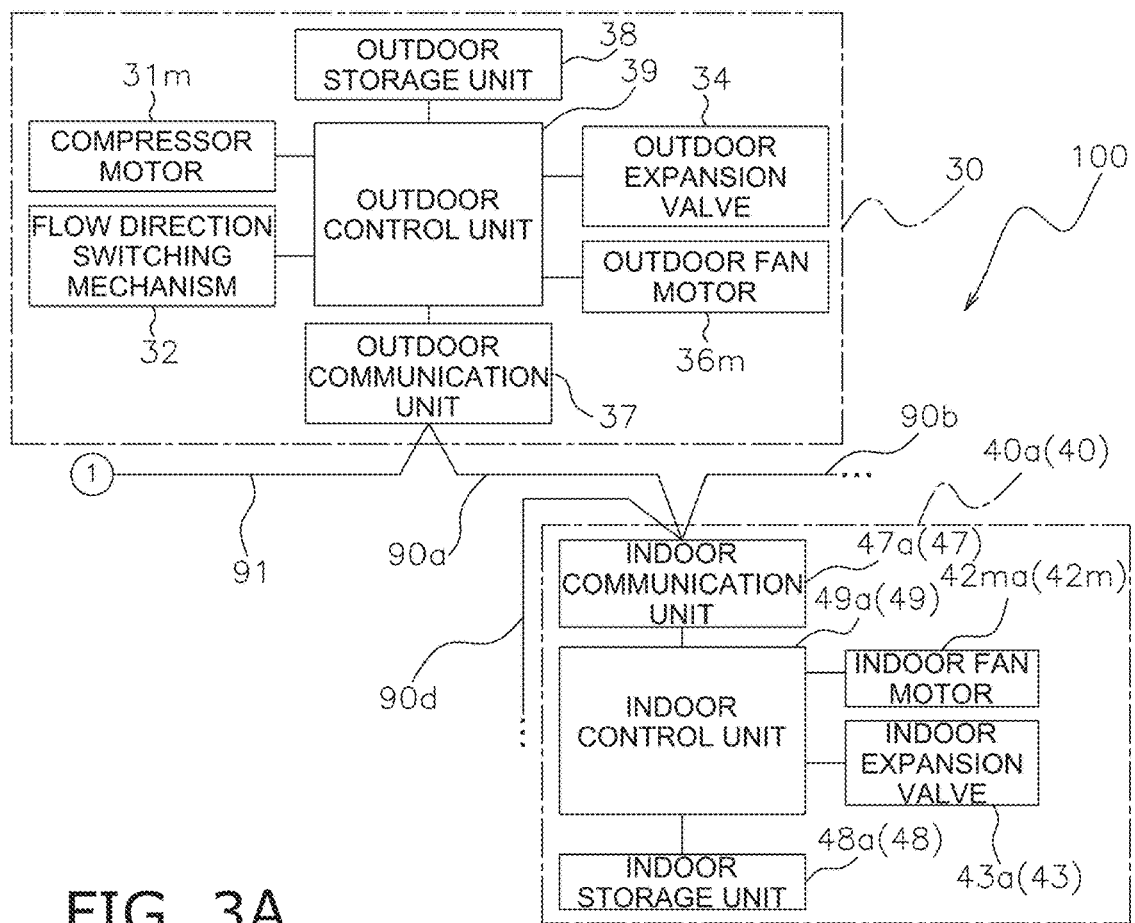
FIG. 3A is a control block diagram of the air conditioning system.

FIG. 3A is a control block diagram of the air conditioning system 100. As illustrated in FIG. 1, the air conditioning system 100 of the present embodiment includes four indoor units 40a to 40d, but FIG. 3A illustrates only the indoor unit 40a as a representative. As illustrated in FIG. 3A, the indoor control unit 49 is electrically connected to various devices of the indoor unit 40, including the indoor fan motor 42m and the indoor expansion valve 43. Further, the indoor control unit 49 is communicably connected to the indoor communication unit 47, the indoor storage unit 48, and various sensors provided in the indoor unit 40.

The indoor control unit 49 is configured to be able to acquire various signals transmitted from an operation remote controller (not illustrated) through a remote controller reception unit (not illustrated). Various signals include, for example, signals for instructing start and stop of operation, and signals related to various settings. The signals related to various settings include, for example, signals related to a set temperature and a set humidity.

The indoor control unit 49 exchanges control signals, measurement signals, signals related to various settings, and the like with a determination control unit 19 of the communication failure determination device 1, an outdoor control unit 39 of the outdoor unit 30, and indoor control units 49 of the other indoor units 40 through the indoor communication unit 47.

The indoor control unit 49 performs a cooling operation, a heating operation, and the like in cooperation with the outdoor control unit 39. The cooling operation and the heating operation will be described later.

In the communication failure determination processing of the communication failure determination device 1, the indoor control unit 49, having received a request signal 71 from the communication failure determination device 1, communicates with the air conditioner 30, 40 having an adjacent address 713 included in the request signal 71, and calculates communication quality information of the communication line 90 between such an air conditioner 30, 40 and the indoor control unit 49 itself. For example, when the indoor control unit 49a has received the request signal 71 in which the adjacent address 713 is the communication address of the indoor unit 40b, the indoor control unit 49a communicates with the indoor unit 40b and calculates communication quality information of the communication line 90b. For example, when the indoor control unit 49b has received the request signal 71 in which the adjacent address 713 is the communication address of the indoor unit 40c, the indoor control unit 49b communicates with the indoor unit 40c and calculates communication quality information of the communication line 90c. For example, when the indoor control unit 49a has received the request signal 71 in which the adjacent address 713 is the communication address of the indoor unit 40d, the indoor control unit 49a communicates with the indoor unit 40d and calculates communication quality information of the communication line 90d. In the present embodiment, the communication quality information is a carrier-to-noise ratio. The carrier-to-noise ratio is the ratio between the carrier power and the noise power. Having calculated the carrier-to-noise ratio, the indoor control unit 49 transmits a reply signal 72 including a value of the calculated carrier-to-noise ratio to the communication failure determination device 1. Details of the request signal 71 and the reply signal 72 will be described later.

(2-2) Outdoor Unit

The outdoor unit 30 is a unit installed on a rooftop or the like of a building in which the air conditioning system 100 is installed. As illustrated in FIG. 2, the outdoor unit 30 mainly includes a compressor 31, a flow direction switching mechanism 32, an outdoor heat exchanger 33, an outdoor expansion valve 34, an accumulator 35, an outdoor fan 36, an outdoor communication unit 37, an outdoor storage unit 38, an outdoor control unit 39, and various sensors (not illustrated).

(2-2-1) Compressor

As illustrated in FIG. 2, the compressor 31 is a device that compresses refrigerant by a compression mechanism (not illustrated) and discharges it. The compressor 31 pressurizes the low-pressure refrigerant in the refrigeration cycle to a high pressure in the refrigeration cycle. Although the type of the compressor 31 is not limited, the compressor 31 is, for example, a rotary or scroll volumetric compressor. The compression mechanism of the compressor 31 is driven by a compressor motor 31m. The number of rotations of the compressor motor 31m can be controlled by an inverter.

(2-2-2) Flow Direction Switching Mechanism

As illustrated in FIG. 2, the flow direction switching mechanism 32 is a mechanism for switching the flow direction of the refrigerant discharged from the compressor 31. In other words, the flow direction switching mechanism 32 is a mechanism that switches the flow direction of the refrigerant in the refrigerant circuit 50. In the present embodiment, the flow direction switching mechanism 32 is a four-way switching valve.

The air conditioning system 100 switches the flow direction of the refrigerant by the flow direction switching mechanism 32 so as to switch the cooling operation and the heating operation.

During the cooling operation, the flow direction switching mechanism 32 causes the refrigerant pipes to communicate with each other as indicated by solid lines in the flow direction switching mechanism 32 in FIG. 2. As a result of the flow direction switching mechanism 32 connecting the refrigerant pipes in this way, during the cooling operation, the refrigerant discharged from the compressor 31 flows through the refrigerant circuit 50 in the order of the outdoor heat exchanger 33, the outdoor expansion valve 34, the indoor expansion valve 43, and the indoor heat exchanger 41, and returns to the suction end of the compressor 31. In the cooling operation, the outdoor heat exchanger 33 functions as a condenser, and the indoor heat exchanger 41 functions as an evaporator.

During the heating operation, the flow direction switching mechanism 32 causes the refrigerant pipes to communicate with each other as indicated by broken lines in the flow direction switching mechanism 32 in FIG. 2. As a result of the flow direction switching mechanism 32 connecting the refrigerant pipes in this way, during the heating operation, the refrigerant discharged from the compressor 31 flows through the refrigerant circuit 50 in the order of the indoor heat exchanger 41, the indoor expansion valve 43, the outdoor expansion valve 34, and the outdoor heat exchanger 33, and returns to the suction end of the compressor 31. In the heating operation, the indoor heat exchanger 41 functions as a condenser, and the outdoor heat exchanger 33 functions as an evaporator.

(2-2-3) Outdoor Heat Exchanger

In the outdoor heat exchanger 33, heat is exchanged between the refrigerant flowing through the outdoor heat exchanger 33 and outdoor air. The structure of the outdoor heat exchanger 33 is not limited, but the outdoor heat exchanger 33 is, for example, a cross-fin type fin-and-tube heat exchanger formed by a heat transfer tube (not illustrated) and a large number of fins (not illustrated).

The outdoor heat exchanger 33 functions as an evaporator during the heating operation and functions as a condenser during the cooling operation.

(2-2-4) Outdoor Expansion Valve

The outdoor expansion valve 34 is a mechanism for adjusting the pressure and flow rate of the refrigerant flowing through the refrigerant pipe. In the present embodiment, the outdoor expansion valve 34 is an electronic expansion valve whose opening degree is adjustable.

(2-2-5) Accumulator

The accumulator 35 is a container having a gas-liquid separation function of separating an inflowing refrigerant into a gas refrigerant and a liquid refrigerant. The refrigerant flowing into the accumulator 35 is separated into a gas refrigerant and a liquid refrigerant, and the gas refrigerant collected in the upper space flows into the compressor 31.

(2-2-6) Outdoor Fan

The outdoor fan 36 is a fan that sucks outdoor air into the outdoor unit 30 to supply the outdoor air to the outdoor heat exchanger 33, and discharges the outdoor air that has exchanged heat with the refrigerant in the outdoor heat exchanger 33 to the outside of the outdoor unit 30. The outdoor fan 36 is, for example, an axial fan such as a propeller fan. The outdoor fan 36 is driven by an outdoor fan motor 36m. The number of rotations of the outdoor fan motor 36m can be controlled by an inverter.

(2-2-7) Outdoor Communication Unit

The outdoor communication unit 37 is a network interface device for communicating with the communication failure determination device 1 and the indoor unit 40. A communication address of the outdoor communication unit 37 is set in the outdoor communication unit 37, for example, when the construction of the air conditioning system 100 is completed. The outdoor communication unit 37 is configured to communicate with the communication failure determination device 1 and the indoor unit 40 by a high-frequency signal.

(2-2-8) Outdoor Storage Unit

The outdoor storage unit 38 is a storage device such as a RAM, a ROM, and a hard disk drive (HDD). The outdoor storage unit 38 stores a program executed by the outdoor control unit 39, data necessary for the execution of the program, and the like.

(2-2-9) Outdoor Control Unit

The outdoor control unit 39 is a processor such as a CPU or a GPU. The outdoor control unit 39 reads a program stored in the outdoor storage unit 38, and performs predetermined arithmetic processing in accordance with the program, thereby controlling the operation of each part forming the outdoor unit 30. In addition, the outdoor control unit 39 can write a calculation result in the outdoor storage unit 38 and read information stored in the outdoor storage unit 38 in accordance with a program. Further, the outdoor control unit 39 includes a timer.

As illustrated in FIG. 3A, the outdoor control unit 39 is electrically connected to various devices of the outdoor unit 30, including the compressor motor 31m, the flow direction switching mechanism 32, the outdoor expansion valve 34, and the outdoor fan motor 36m. Further, the outdoor control unit 39 is communicably connected to the outdoor communication unit 37, the outdoor storage unit 38, and various sensors provided in the outdoor unit 30.

The outdoor control unit 39 exchanges control signals, measurement signals, signals related to various settings, and the like with the determination control unit 19 of the communication failure determination device 1 and the indoor control unit 49 of the indoor unit 40 through the outdoor communication unit 37.

The outdoor control unit 39 performs a cooling operation, a heating operation, and the like in cooperation with the indoor control unit 49.

When an instruction for a cooling operation is given from an operation remote controller or the like, the outdoor control unit 39 and the indoor control unit 49 control the flow direction switching mechanism 32 so that the flow direction switching mechanism 32 enters the state illustrated by the solid lines in FIG. 2. In the cooling operation, the low-pressure gas refrigerant in the refrigerant circuit 50 is sucked and compressed by the compressor 31 into a high-pressure gas refrigerant. The gas refrigerant compressed by the compressor 31 is sent to the outdoor heat exchanger 33 through the flow direction switching mechanism 32. The high-pressure gas refrigerant sent to the outdoor heat exchanger 33 exchanges heat with the outdoor air supplied by the outdoor fan 36, is cooled and condensed, and becomes a high-pressure liquid refrigerant in the outdoor heat exchanger 33 functioning as a condenser. The liquid refrigerant condensed in the outdoor heat exchanger 33 is decompressed and expanded by the outdoor expansion valve 34, and is sent to the indoor unit 40. The refrigerant sent to the indoor unit 40 is decompressed by the indoor expansion valve 43 and sent to the indoor heat exchanger 41. The refrigerant sent to the indoor heat exchanger 41 exchanges heat with the indoor air supplied by the indoor fan 42, is heated and evaporated, and becomes a low-pressure gas refrigerant in the indoor heat exchanger 41 functioning as an evaporator. The low-pressure gas refrigerant is sent from the indoor unit 40 to the outdoor unit 30. The low-pressure gas refrigerant sent to the outdoor unit 30 is sucked again into the compressor 31 through the flow direction switching mechanism 32.

When an instruction for a heating operation is given from an operation remote controller or the like, the outdoor control unit 39 and the indoor control unit 49 control the flow direction switching mechanism 32 so that the flow direction switching mechanism 32 enters the state illustrated by the broken lines in FIG. 2. In the heating operation, the low-pressure gas refrigerant in the refrigerant circuit 50 is sucked and compressed by the compressor 31 into a high-pressure gas refrigerant. The gas refrigerant compressed by the compressor 31 is sent from the outdoor unit 30 to the indoor unit 40 through the flow direction switching mechanism 32. The high-pressure gas refrigerant sent to the indoor unit 40 is sent to the indoor heat exchanger 41. The high-pressure gas refrigerant sent to the indoor heat exchanger 41 exchanges heat with the indoor air supplied by the indoor fan 42, is cooled and condensed, and becomes a high-pressure liquid refrigerant in the indoor heat exchanger 41 functioning as a condenser. The high-pressure liquid refrigerant is decompressed by the indoor expansion valve 43 and sent from the indoor unit 40 to the outdoor unit 30. The refrigerant sent to the outdoor unit 30 is decompressed by the outdoor expansion valve 34 and sent to the outdoor heat exchanger 33. The refrigerant sent to the outdoor heat exchanger 33 exchanges heat with the outdoor air supplied by the outdoor fan 36, is heated and evaporated, and becomes a low-pressure gas refrigerant in the outdoor heat exchanger 33 functioning as an evaporator. The low-pressure gas refrigerant is sucked again into the compressor 31 through the flow direction switching mechanism 32.

In the communication failure determination processing of the communication failure determination device 1, the outdoor control unit 39, having received the request signal 71 from the communication failure determination device 1, communicates with the air conditioner 30, 40 having the adjacent address 713 included in the request signal 71, and calculates a carrier-to-noise ratio (communication quality information) of the communication line 90 between such an air conditioner 30, 40 and the outdoor control unit 39 itself. For example, when the outdoor control unit 39 has received the request signal 71 in which the adjacent address 713 is the communication address of the indoor unit 40a, the outdoor control unit 39 communicates with the indoor unit 40a and calculates a carrier-to-noise ratio of the communication line 90a. Having calculated the carrier-to-noise ratio, the outdoor control unit 39 transmits the reply signal 72 including a value of the calculated carrier-to-noise ratio to the communication failure determination device 1. Details of the request signal 71 and the reply signal 72 will be described later.

(2-3) Communication Failure Determination Device

Figure 3B:
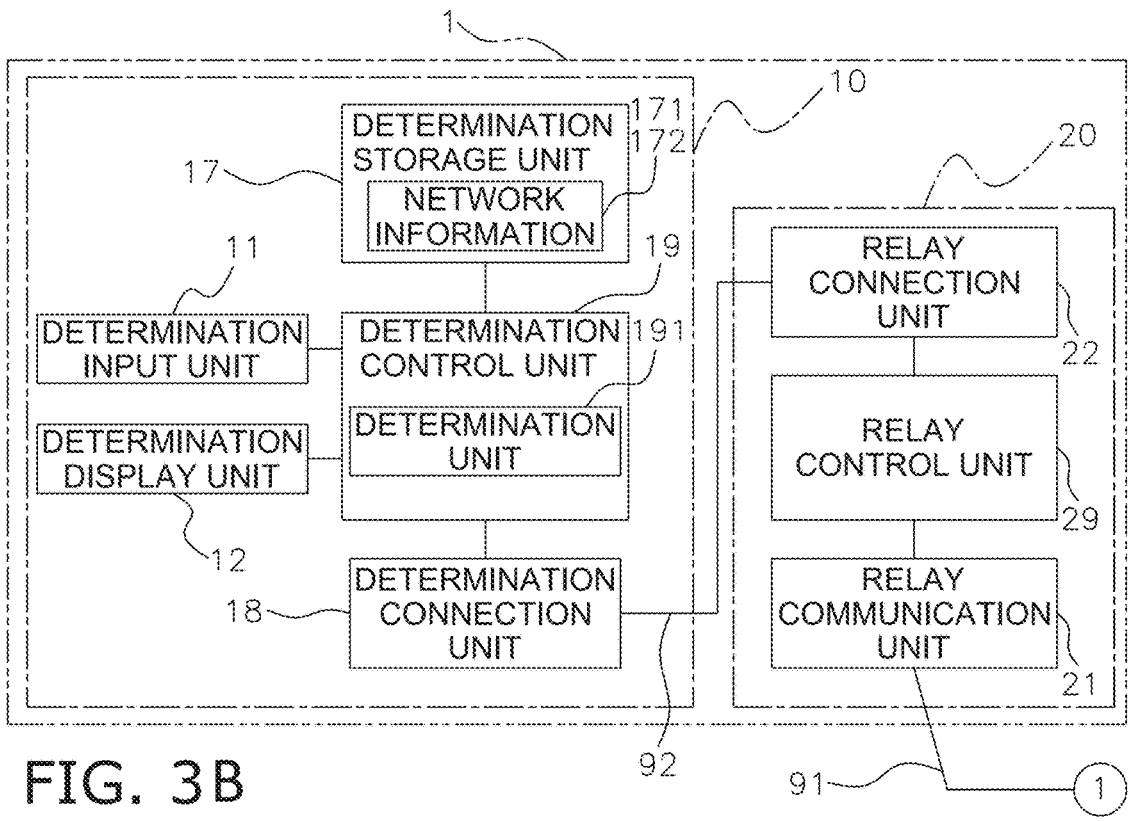
FIG. 3B is a control block diagram of the communication failure determination device.

FIG. 3B is a control block diagram of the communication failure determination device 1. As illustrated in FIG. 3B, the communication failure determination device 1 includes a determination terminal 10 and a relay terminal 20. The determination terminal 10 and the relay terminal 20 are communicably connected to each other by a communication cable 92. In the present embodiment, the communication cable 92 is a USB cable.

(2-3-1) Relay Terminal

The relay terminal 20 receives communication quality information from the air conditioner 30, 40 and transmits the communication quality information to the determination terminal 10. As illustrated in FIG. 3B, the relay terminal 20 includes a relay communication unit 21, a relay connection unit 22, and a relay control unit 29.

(2-3-1-1) Relay Communication Unit

The relay communication unit 21 is a network interface device for communicating with the air conditioner 30, 40. A communication address of the relay communication unit 21 is set in the relay communication unit 21. In other words, the communication address of the communication failure determination device 1 is set in the relay communication unit 21. The relay communication unit 21 is configured to communicate with the air conditioner 30, 40 by a high-frequency signal.

(2-3-1-2) Relay Connection Unit

The relay connection unit 22 is a terminal for connecting to a determination connection unit 18 of the determination terminal 10 by using the communication cable 92. In the present embodiment, the relay connection unit 22 is a USB terminal.

(2-3-1-3) Relay Control Unit

The relay control unit 29 is a processor such as a CPU or a GPU. The relay control unit 29 reads and executes a program stored in a storage device (not illustrated) to implement various functions of the relay terminal 20. In addition, the relay control unit 29 can write a calculation result in the storage device and read information stored in the storage device in accordance with a program. The relay control unit 29 includes a timer.

The relay control unit 29 relays communication between the determination terminal 10 and the air conditioner 30, 40. In addition, because the communication protocol is usually different between the determination terminal 10 and the air conditioner 30, 40, the relay control unit 29 converts a communication protocol in accordance with each specification when relaying communication.

(2-3-2) Determination Terminal

As illustrated in FIG. 3B, the determination terminal 10 includes a determination input unit 11, a determination display unit 12, a determination storage unit 17, the determination connection unit 18, and the determination control unit 19.

(2-3-2-1) Determination Input Unit

The determination input unit 11 is a keyboard and a mouse. The user of the communication failure determination device 1 can cause the communication failure determination device 1 to execute communication failure determination processing by using the determination input unit 11.

(2-3-2-2) Determination Display Unit

The determination display unit 12 is a display. For example, a determination result of the communication failure determination processing is displayed on the determination display unit 12.

(2-3-2-3) Determination Storage Unit

The determination storage unit 17 is a storage device such as a RAM, a ROM, and a hard disk drive (HDD). The determination storage unit 17 stores a program executed by the determination control unit 19, data necessary for the execution of the program, and the like.

As illustrated in FIG. 3B, the determination storage unit 17 stores network information 171, 172 of the air conditioning system 100.

The network information 171 stores the communication addresses of the air conditioners 30, 40 included in the air conditioning system 100. The following Table 1 shows an example of the network information 171.

TABLE 1

| Air conditioner | Communication address |
|---|---|
| Outdoor unit 30 | 111 |
| Indoor unit 40a | 222 |
| Indoor unit 40b | 333 |
| Indoor unit 40c | 444 |
| Indoor unit 40d | 555 |

As shown in Table 1, the network information 171 stores the outdoor unit 30 and the indoor units 40a to 40d included in the air conditioning system 100, and the communication addresses thereof. It can be seen from Table 1 that, for example, the communication address of the outdoor unit 30 is "111".

Further, the network information 172 stores the connection relationship between the air conditioners 30, 40 included in the air conditioning system 100. The network information 172 includes a network diagram as illustrated in FIG. 1. The following Table 2 shows an example of the network information 172.

TABLE 2

| Communication line | Air conditioner α | Air conditioner β | Carrier-to-noise ratio (in normal state) | Determination threshold |
|---|---|---|---|---|
| Communication line 90a | Outdoor unit 30 | Indoor unit 40a | 35 dB | 17.5 dB |
| Communication line 90b | Indoor unit 40a | Indoor unit 40b | 37 dB | 18.5 dB |
| Communication line 90c | Indoor unit 40b | Indoor unit 40c | 34 dB | 17 dB |
| Communication line 90d | Indoor unit 40a | Indoor unit 40d | 39 dB | 19.5 dB |

As shown in Table 2, the network information 172 stores, or each communication line 90 of the air conditioning system 100, the air conditioner 30, 40 connected to the communication line 90, a value of the carrier-to-noise ratio when the communication line 90 is in the normal state, and a determination threshold. The determination threshold will be described later. It can be seen from Table 2 that, for example, the outdoor unit 30 and the indoor unit 40a are connected to the communication line 90a, and the value of the carrier-to-noise ratio of the communication line 90a in the normal state is 35 dB.

The network information 171, 172 are created, for example, when the construction of the air conditioning system 100 is completed. In other words, the network information 171, 172 are information when the air conditioning system 100 is normal. The value of the "carrier-to-noise ratio (in normal state)" of the network information 172 can be acquired by executing acquisition processing in the communication failure determination processing described later, for example, when the construction of the air conditioning system 100 is completed.

(2-3-2-4) Determination Connection Unit

The determination connection unit 18 is a terminal for connecting to the relay connection unit 22 of the relay terminal 20 by using the communication cable 92. In the present embodiment, the determination connection unit 18 is a USB terminal.

(2-3-2-5) Determination Control Unit

The determination control unit 19 is a processor such as a CPU or a GPU. The determination control unit 19 reads and executes a program stored in the determination storage unit 17 to implement various functions of the determination terminal 10. In addition, the determination control unit 19 can write a calculation result in the determination storage unit 17 and read information stored in the determination storage unit 17 in accordance with a program. The determination control unit 19 includes a timer.

The determination control unit 19 includes a determination unit 191 as a functional block, as illustrated in FIG. 3B.

(2-3-2-5-1) Determination Unit

The determination unit 191 is a functional block that realizes communication failure determination processing. The communication failure determination processing includes acquisition processing and determination processing.

Figure 4:
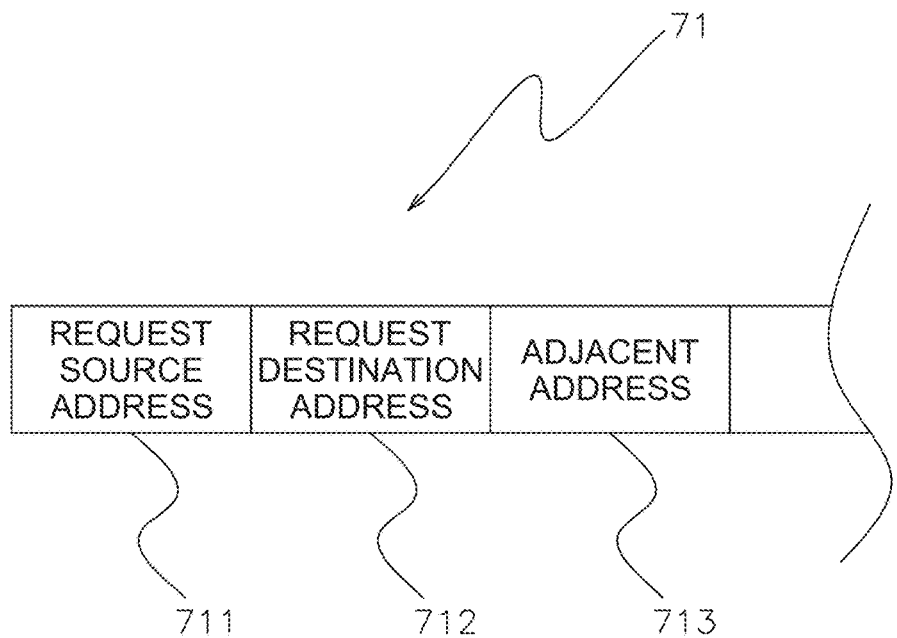
FIG. 4 is a diagram illustrating an example of a configuration of a request signal.

First, as acquisition processing, the determination unit 191 acquires, from the air conditioner 30, 40, a carrier-to-noise ratio (communication quality information) when communication is performed between the air conditioners 30, 40. To be specific, in order to acquire the carrier-to-noise ratios of the communication lines 90a to 90d of the air conditioning system 100, the determination unit 191 transmits the request signal 71 to the air conditioners 30, 40 to which the respective communication lines are connected. In other words, the determination unit 191 transmits the request signal 71 to the air conditioner 30, 40 in correspondence with each record of the network information 172 in Table 2. FIG. 4 is a diagram illustrating an example of the configuration of the request signal 71. As illustrated in FIG. 4, the request signal 71 includes a request source address 711, a request destination address 712, and an adjacent address 713. A communication address of a transmission source of the request signal 71 is stored in the request source address 711. In the present embodiment, the communication address of the communication failure determination device 1 is stored in the request source address 711. The communication address of a transmission destination of the request signal 71 is stored in the request destination address 712. In the present embodiment, the communication address of the air conditioner 30, 40 stored in the "air conditioner α" of the network information 172 in Table 2 is stored in the request destination address 712. The communication address of the air conditioner 30, 40 can be acquired from the network information 171 in Table 1. The adjacent address 713 stores the communication address of the air conditioner 30, 40 adjacent to the air conditioner 30, 40 that is the transmission destination of the request signal 71. In the present embodiment, the communication address of the air conditioner 30, 40 stored in the "air conditioner β" of the network information 172 in Table 2 is stored in the adjacent address 713. For example, the determination unit 191 transmits, to the outdoor unit 30, the request signal 71 in which the request source address 711 is the communication address of the communication failure determination device 1, the request destination address 712 is the communication address "111" of the outdoor unit 30, and the adjacent address 713 is the communication address "222" of the indoor unit 40a, corresponding to the first record of the network information 172 in Table 2.

Figure 5:
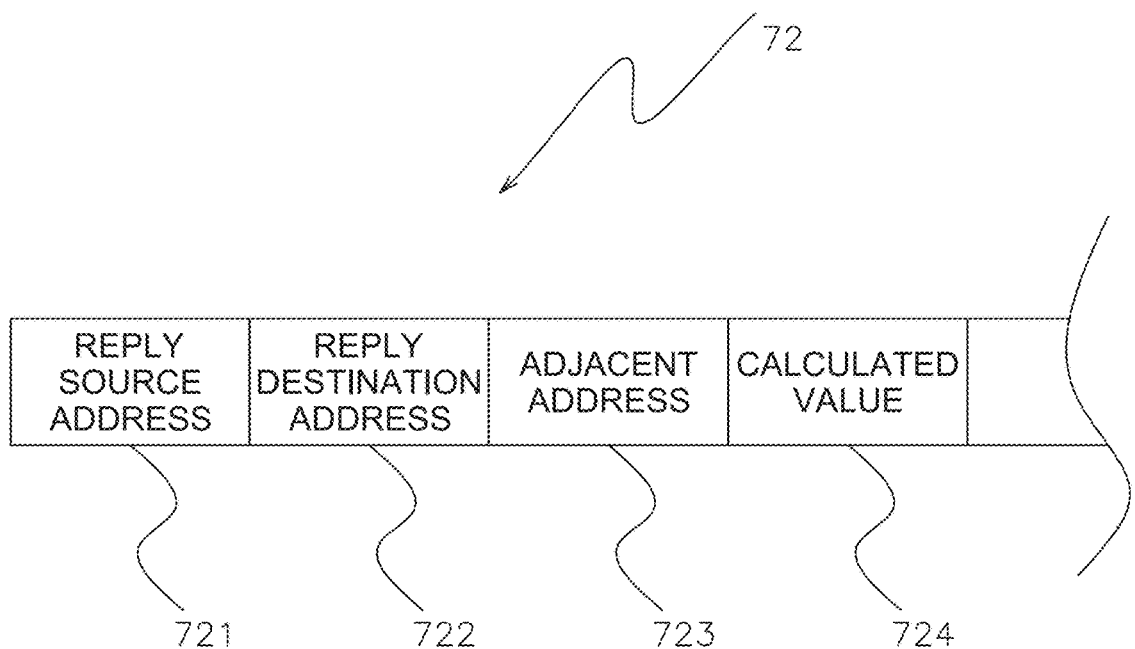
FIG. 5 is a diagram illustrating an example of a configuration of a reply signal.

Having transmitted the request signal 71, the determination unit 191 receives the reply signal 72 from the transmission destination of the request signal 71 in response to the request signal 71. FIG. 5 is a diagram illustrating an example of the configuration of the reply signal 72. As illustrated in FIG. 5, the reply signal 72 includes a reply source address 721, a reply destination address 722, an adjacent address 723, and a calculated value 724. The communication address of the transmission source of the reply signal 72 is stored in the reply source address 721. In other words, the communication address of the transmission destination of the corresponding request signal 71 is stored in the reply source address 721. The communication address of the transmission destination of the reply signal 72 is stored in the reply destination address 722. In other words, the communication address of the communication failure determination device 1 is stored in the reply destination address 722. The communication address of the air conditioner 30, 40 adjacent to the transmission source of the reply signal 72 is stored in the adjacent address 723. In other words, the adjacent address 713 of the corresponding request signal 71 is stored in the adjacent address 723. In the calculated value 724, the value of the carrier-to-noise ratio calculated by the transmission source of the reply signal 72 is stored. In other words, the value of the carrier-to-noise ratio for the communication line 90 between the air conditioner 30, 40 having the reply source address 721 of the reply signal 72 and the air conditioner 30, 40 having the adjacent address 713 of the reply signal 72 is stored in the calculated value 724. For example, in response to the request signal 71 corresponding to the first record of the network information 172 in Table 2, the determination unit 191 receives, from the outdoor unit 30a, the reply signal 72 in which the reply source address 721 is the communication address "111" of the outdoor unit 30, the reply destination address 722 is the communication address of the communication failure determination device 1, the adjacent address 723 is the communication address "222" of the indoor unit 40a, and the calculated value 724 is the value of the carrier-to-noise ratio of the communication line 90a.

Having received the reply signal 72, the determination unit 191 compares the reply source address 721 of the reply signal 72 with the "air conditioner α" of the network information 172 in Table 2, and the adjacent address 723 of the reply signal 72 with the "air conditioner β" of the network information 172 in Table 2 while referring to the network information 171, thereby acquiring a value of the carrier-to-noise ratio for each of the communication lines 90a to 90d. For example, the determination unit 191 can acquire the value (calculated value 724) of the carrier-to-noise ratio of the communication line 90a from the reply signal 72 in which the reply source address 721 is the communication address "111" of the outdoor unit 30 and the adjacent address 723 is the communication address "222" of the indoor unit 40a. The following Table 3 is obtained by adding the acquired value of the carrier-to-noise ratio to the network information 172 in Table 2. The values of the carrier-to-noise ratios in Table 3 are examples. In Table 3, the item of "determination threshold" is omitted.

TABLE 3

| Communication line | Air conditioner α | Air conditioner β | Carrier-to-noise ratio (in normal state) | Carrier-to-noise ratio (at acquisition) |
| --- | --- | --- | --- | --- |
| Communication line 90a | Outdoor unit 30 | Indoor unit 40a | 35 dB | 34 dB |
| Communication line 90b | Indoor unit 40a | Indoor unit 40b | 37 dB | 10 dB |
| Communication line 90c | Indoor unit 40b | Indoor unit 40c | 34 dB | 35 dB |
| Communication line 90d | Indoor unit 40a | Indoor unit 40d | 39 dB | 40 dB |

In Table 3, the value of the carrier-to-noise ratio acquired by the acquisition processing is stored in "carrier-to-noise ratio (at acquisition)". It can be seen from Table 3 that, for example, the value of the carrier-to-noise ratio of the communication line 90a is 34 dB.

Next, as determination processing, the determination unit 191 determines whether or not a failure occurs for each of the communication lines 90a to 90d on the basis of the carrier-to-noise ratio (communication quality information). To be specific, the determination unit 191 determines whether or not a failure occurs for each of the communication lines 90a to 90d on the basis of the determination thresholds calculated from the past carrier-to-noise ratio. In the present embodiment, the determination threshold calculated from the past carrier-to-noise ratio is set to a value of ½ of the carrier-to-noise ratio in the normal state. In other words, the determination threshold calculated from the past carrier-to-noise ratio is a value of ½ of the "carrier-to-noise ratio (in normal state)" of the network information 172 in Table 2. A value of ½ of the "carrier-to-noise ratio (in normal state)" is actually stored in the "determination threshold" of the network information 172 in Table 2. In the following Table 4, the item "determination threshold" is displayed and the items "air conditioner α" and "air conditioner β" are omitted in the network information 172 in Table 3.

TABLE 4

| Communication line | Carrier-to-noise ratio (in normal state) | Determination threshold | Carrier-to-noise ratio (at acquisition) |
|---|---|---|---|
| Communication line 90a | 35 dB | 17.5 dB | 34 dB |
| Communication line 90b | 37 dB | 18.5 dB | 10 dB |
| Communication line 90c | 34 dB | 17 dB | 35 dB |
| Communication line 90d | 39 dB | 19.5 dB | 40 dB |

When the value of the carrier-to-noise ratio of the communication line 90 acquired by the acquisition processing is smaller than the determination threshold, the determination unit 191 determines that a failure occurs in the communication line 90. The following Table 5 is obtained by adding the determination result to the network information 172 in Table 4.

TABLE 5

| Communication line | Carrier-to-noise ratio (in normal state) | Carrier-to-noise ratio (at acquisition) | Determination threshold | Determination result |
|---|---|---|---|---|
| Communication line 90a | 35 dB | 34 dB | 17.5 dB | Normal |
| Communication line 90b | 37 dB | 10 dB | 18.5 dB | Failed |
| Communication line 90c | 34 dB | 35 dB | 17 dB | Normal |
| Communication line 90d | 39 dB | 40 dB | 19.5 dB | Normal |

In Table 5, in a case where the determination unit 191 determines that a failure occurs in the communication line 90, "failed" is stored in the "determination result". In Table 5, in a case where the determination unit 191 determines that a failure does not occur in the communication line 90, "normal" is stored in the "determination result".

As shown in Table 5, for example, the value (34 dB) of the carrier-to-noise ratio of the communication line 90a acquired by the acquisition processing is not smaller than the determination threshold (17.5 dB) of the communication line 90a, and thus the determination unit 191 determines that a failure does not occur in the communication line 90a. In addition, for example, the value (10 dB) of the carrier-to-noise ratio of the communication line 90b acquired by the acquiring processing is smaller than the determination threshold (18.5 dB) of the communication line 90b, and thus the determination unit 191 determines that a failure occurs in the communication line 90b.

Figure 6:
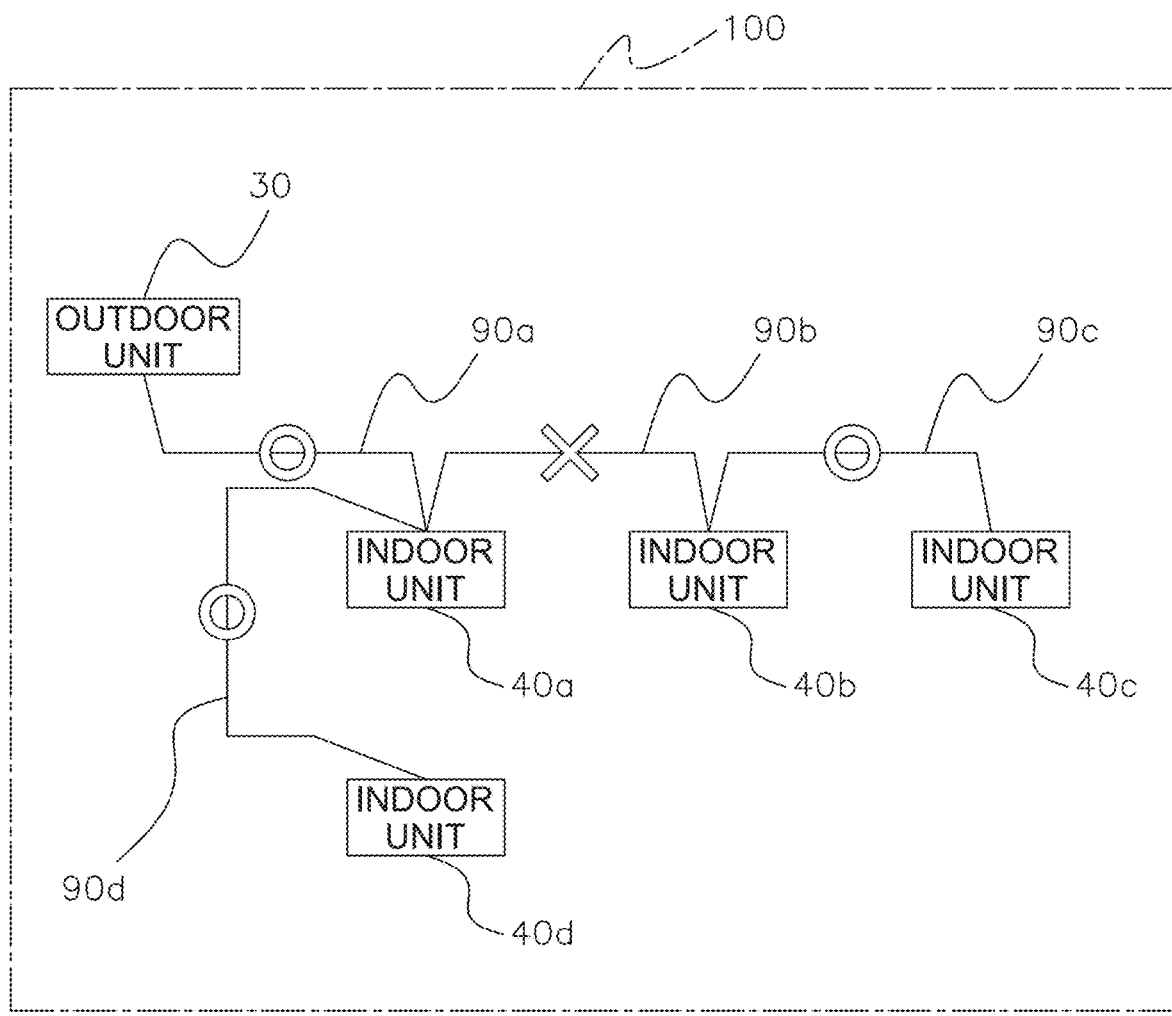
FIG. 6 is a diagram illustrating an example of a determination result of communication failure determination processing.

When the determination for all the communication lines 90a to 90d is finished, the determination unit 191 displays a determination result of the communication failure determination processing on the determination display unit 12 with reference to, for example, the network information 172 in Table 5 and the network diagram included in the network information 172. FIG. 6 is a diagram illustrating an example of a determination result of the communication failure determination processing. As illustrated in FIG. 6, the determination unit 191 displays circle marks on the communication lines 90a, 90c, and 90d to indicate that no failure occurs in the communication line 90a, 90c, or 90d. In addition, the determination unit 191 displays a cross mark on the communication line 90b to indicate that a failure occurs in the communication line 90b.

(3) Communication Failure Determination Processing

Figure 7:
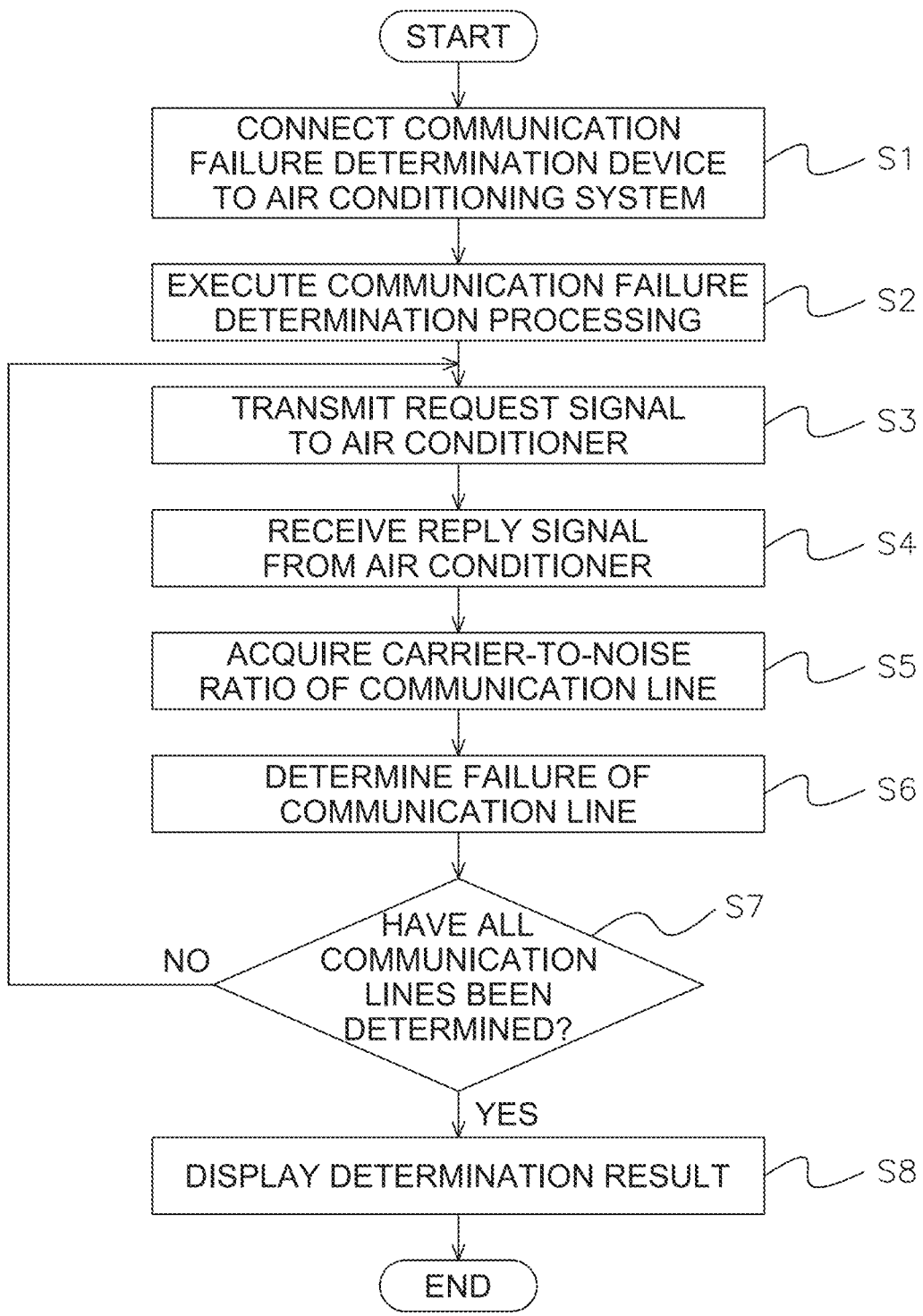
FIG. 7 is a flowchart of the communication failure determination processing.

An example of the communication failure determination processing will be described with reference to the flowchart of FIG. 7. The communication failure determination processing is executed, for example, at the time of maintenance of the air conditioning system 100. As a premise, it is assumed that the network information 171, 172 of the air conditioning system 100 created at the time of completion of construction of the air conditioning system 100 is stored in the determination storage unit 17 of the communication failure determination device 1.

As shown in step S1, the user of the communication failure determination device 1 connects the communication failure determination device 1 and the air conditioning system 100 by the communication line 91. To be specific, the relay communication unit 21 of the relay terminal 20 of the communication failure determination device 1 and the outdoor communication unit 37 of the outdoor unit 30 are connected by the communication line 91.

After completing step S1, the user of the communication failure determination device 1 executes the communication failure determination processing by using the determination input unit 11 of the communication failure determination device 1, as shown in step S2.

After completing step S2, the communication failure determination device 1 selects one record from the network information 172, and transmits the request signal 71 corresponding to the record to the air conditioner 30, 40, as shown in step S3.

After completing step S3, the communication failure determination device 1 receives the reply signal 72 from the air conditioner 30, 40 that is a transmission destination of the request signal 71, as shown in step S4.

After completing step S4, the communication failure determination device 1 acquires a value of the carrier-to-noise ratio for the communication line 90 of the record selected in the network information 172, as shown in step S5.

After completing step S5, the communication failure determination device 1 determines whether or not a failure occurs in the communication line 90 of the record selected in the network information 172, as shown in step S6.

After completing step S6, the communication failure determination device 1 determines whether or not the request signal 71 has been transmitted for all the records of the network information 172, as shown in step S7. In other words, the communication failure determination device 1 determines whether or not all the communication lines 90a to 90d of the air conditioning system 100 have been subjected to failure determination processing. When the request signal 71 has been transmitted for all the records of the network information 172, the communication failure determination device 1 shifts the processing to step S8. When the request signal 71 has not been transmitted for all of the records of the network information 172, the communication failure determination device 1 returns the processing to step S3, and transmits the request signal 71 to the air conditioner 30, 40 for a record of the network information 172 that has not been selected.

After shifting the processing from step S7 to step S8, the communication failure determination device 1 displays the determination result of the communication failure determination processing on the determination display unit 12, as illustrated in FIG. 6.

(4) Feature (4-1)

Conventionally, there is a technique for determining whether or not a failure occurs in a communication line in accordance with whether or not communication with each communication device included in a communication system is possible.

However, for example, in a communication system that performs communication by using a high-frequency signal, communication may be possible even when a failure such as a short circuit or disconnection occurs in a communication line. Therefore, there is a problem that a failure of a communication line cannot be accurately detected when communication with each communication device is possible.

The communication failure determination device 1 of the present embodiment determines a failure of the communication line 90 in the air conditioning system 100 including two or more air conditioners 30, 40 connected in a wired manner by the communication line 90. The communication failure determination device 1 includes the determination unit 191. The determination unit 191 acquires the carrier-to-noise ratio when communication is performed between the air conditioners 30, 40. The determination unit 191 determines whether or not a failure occurs in the communication line 90 on the basis of the carrier-to-noise ratio acquired from the air conditioner 30, 40.

The communication failure determination device 1 of the present embodiment determines whether or not a failure occurs in the communication lines 90a to 90d on the basis of the carrier-to-noise ratios of the communication lines 90a to 90d acquired from the outdoor unit 30 and the indoor units 40a to 40d. As a result, the communication failure determination device 1 can detect a failure of the communication lines 90a to 90d even when the communication with the outdoor unit 30 and the indoor units 40a to 40d is possible. In addition, the communication failure determination device 1 can acquire carrier-to-noise ratios from the outdoor unit 30 and the indoor units 40a to 40d.

(4-2)

In the communication failure determination device 1 of the present embodiment, the outdoor unit 30 and the indoor units 40a to 40d communicate with each other by high-frequency signals having a frequency equal to or higher than 100 kHz. As a result, the communication failure determination device 1 can detect a failure of the communication lines 90a to 90d even in the air conditioning system 100 that performs communication by using a high-frequency signal.

(4-3)

In the communication failure determination device 1 of the present embodiment, the air conditioning system 100 includes three or more air conditioners 3, 40 and two or more communication lines 90. The determination unit 191 determines whether or not a failure occurs for each of the communication lines 90a to 90d. As a result, the communication failure determination device 1 can clarify a failure location.

(4-4)

In the communication failure determination device 1 of the present embodiment, the determination unit 191 determines whether or not a failure occurs in the communication lines 90a to 90d on the basis of the determination thresholds calculated from the past (in normal state) carrier-to-noise ratios. As a result, the communication failure determination device 1 can detect a failure of the communication lines 90a to 90d on the basis of the past (in normal state) data.

(4-5)

The communication failure determination device 1 of the present embodiment includes the determination terminal 10 and the relay terminal 20. The determination terminal 10 includes the determination unit 191. The relay terminal 20 receives the carrier-to-noise ratios from the outdoor unit 30 and the indoor units 40a to 40d, and transmits the carrier-to-noise ratios to the determination terminal 10. As a result, the communication failure determination device 1 can perform communication protocol conversion and the like through the relay terminal 20.

(5) Modification (5-1) Modification 1A

In the present embodiment, the communication quality information is a carrier-to-noise ratio. However, the communication quality information may be signal intensity or a communication speed. In this case, the air conditioner 30, 40 calculates a value of the signal intensity or a communication speed of the communication line 90 in response to the request signal 71 from the communication failure determination device 1, and transmits the reply signal 72 to the communication failure determination device 1. For example, when the value of the signal intensity or the communication speed of the communication line 90 acquired by the acquisition processing is smaller than a determination threshold calculated from the signal intensity or the communication speed in the normal state, the determination unit 191 determines that a failure occurs in the communication line 90.

As a result, the communication failure determination device 1 can detect a failure of the communication line 90 on the basis of the signal intensity or the communication speed.

(5-2) Modification 1B

In the present embodiment, the determination unit 191 determines whether or not a failure occurs in the communication line 90 on the basis of the communication quality information in one frequency band of the frequency-division multiplexed signal. However, the determination unit 191 may determine whether or not a failure occurs in the communication line 90 on the basis of the communication quality information in two or more frequency bands of the frequency-division multiplexed signal.

For example, the air conditioner 30, 40 calculates the communication quality information of the communication line 90 in two or more frequency bands, and transmits the average value thereof as the calculated value 724 to the communication failure determination device 1. For example, when the average value of the communication quality information of the communication line 90 acquired by the acquisition processing is smaller than a determination threshold calculated from the average value of the communication quality information in the normal state, the determination unit 191 determines that a failure occurs in the communication line 90.

Further, for example, the air conditioner 30, 40 calculates the communication quality information of the communication line 90 in two or more frequency bands, and transmits all of them as the calculated values 724 to the communication failure determination device 1. For example, when each of two or more pieces of communication quality information of the communication line 90 acquired by the acquisition processing is smaller than a determination threshold calculated from the communication quality information in the normal state, the determination unit 191 determines that a failure occurs in the communication line 90.

As a result, the communication failure determination device 1 can detect a failure of the communication line 90 more accurately.

(5-3) Modification 1C

In the present embodiment, the communication failure determination device 1 and the air conditioning system 100 are connected by the communication line 91. However, the communication failure determination device 1 and the air conditioning system 100 may be communicably connected to each other wirelessly.

(5-4) Modification 1D

In the present embodiment, the communication failure determination device 1 includes the determination terminal 10 and the relay terminal 20. However, for example, a device having the function of the relay terminal 20 may be installed in the determination terminal 10, and such a determination terminal 10 may be used as the communication failure determination device 1. In this case, the communication cable 92 is, for example, a communication bus in the determination terminal 10.

(5-5) Modification 1E

In the present embodiment, the air conditioning system 100 is a multi-type air conditioning system for a building. However, the air conditioning system 100 is not limited to the multi-type air conditioning system for a building, and may be a system having at least two air conditioners 30, 40.

(5-6) Modification 1F

In the present embodiment, the communication failure determination device 1 determines whether or not a failure occurs in the communication line 90 by using a high-frequency signal. However, the communication failure determination device 1 may separately use a low-frequency signal to determine whether or not a disconnection occurs in the communication line 90. The low-frequency signal has, for example, a frequency equal to or lower than 10 kHz.

In this case, the relay communication unit 21 is configured to be able to transmit a low-frequency signal to the outdoor unit 30 and the indoor unit 40. Further, the outdoor communication unit 37 and the indoor communication unit 47 are configured to be able to receive a low frequency signal from the communication failure determination device 1.

For example, the communication failure determination device 1 transmits a low-frequency confirmation signal to the outdoor unit 30 and the indoor units 40*a* to 40*d* on the basis of the network information 171 of Table 1. Having received the confirmation signal, the outdoor unit 30 and the indoor units 40*a* to 40*d* notify, as a reply, the communication failure determination device 1 of the reception.

Unlike the high-frequency signal, the low-frequency signal cannot be communicated through the communication line 90 when the communication line 90 is disconnected. Therefore, for example, when there is a reply to the confirmation signal from the indoor unit 40*b* and there is no reply to the confirmation signal from the indoor unit 40*c*, the communication failure determination device 1 determines that a disconnection occurs in the communication line 90*c* (see FIG. 1).

(5-7) Modification 1G

In the present embodiment, the network information 171 of the air conditioning system 100 and the network information 172 including the determination threshold are stored in the determination storage unit 17 of the communication failure determination device 1. However, for example, the network information 171, 172 may be stored in a server on a cloud or the like that is communicably connected to the air conditioning system 100 via the Internet or the like. In this case, when executing the communication failure determination processing, the determination unit 191 of the communication failure determination device 1 acquires the network information 171, 172 from the server on the cloud. In other words, the determination unit 191 acquires a determination threshold from a device other than the communication failure determination device 1 including the determination unit 191 itself.

As a result, the communication failure determination device 1 can acquire the determination threshold from a predetermined device.

(5-8) Modification 1H

In the present embodiment, the communication failure determination device 1 and the air conditioning system 100 are connected by the communication line 91. However, the communication failure determination device 1 may be installed on a cloud that is communicably connected to the air conditioning system 100 via the Internet or the like. In this case, the determination unit 191 of the communication failure determination device 1 may periodically acquire the communication quality information from the air conditioner 30, 40 and determine whether or not a failure occurs in the communication line 90.

As a result, the communication failure determination device 1 can periodically detect a failure of the communication line 90.

(5-9) Modification 1I

In the present embodiment, the high-frequency signal includes a plurality of frequency-division multiplexed signals, but the embodiment is not limited thereto. The high-frequency signal may include a single signal.

(5-10) Modification 1J

In the present embodiment, a two core vinyl cabtire round cord (VCTF) is used for the communication lines 90, 91, but the embodiment is not limited thereto. For the communication lines 90, 91, there may be used cables of different types such as a vinyl cabtire elliptical cord (VCTFK), a vinyl insulated vinyl cabtire cable (VCT), a vinyl insulated vinyl sheath cable round shape (VVR), a vinyl insulated vinyl sheath cable flat shape (VVF), and a vinyl insulated vinyl sheath cable for control (CVV). Furthermore, a cord or a cable having three or more cores may be used for the communication lines 90, 91.

(5-11)

While embodiments of the present disclosure have been described above, it will be understood that various changes in form and detail may be made therein without departing from the spirit and scope of the present disclosure as set forth in the claims.

The invention claimed is:

1. A communication failure determination device configured to determine a failure of a communication line in a communication system including two or more communication devices connected in a wired manner by the communication line, the communication failure determination device comprising:
- a storage that stores a program; and
- a processor configured to execute the program so as to
  - acquire communication quality information indicating a carrier-to-noise ratio, a signal intensity, or a communication speed of the communication line when communication is performed between the communication devices,
  - determine whether or not a short circuit or a disconnection occurs in the communication line based on the carrier-to-noise ratio, the signal intensity, or the communication speed,
  - the communication devices communicating with each other at a frequency equal to or higher than 100 kHz.

2. The communication failure determination device according to claim 1, wherein
the processor is configured to acquire the communication quality information from the communication devices.

3. The communication failure determination device according to claim 2, wherein
the processor is configured to determine whether or not the short circuit or the disconnection occurs in the communication line based on the carrier-to-noise ratio, the signal intensity, or the communication speed in two or more frequency bands.

4. The communication failure determination device according to claim 2, wherein
the communication system includes three or more of the communication devices and two or more of the communication line, and
the processor is configured to determine whether or not the short circuit or the disconnection occurs for each of the communication lines.

5. The communication failure determination device according to claim 2, wherein
the processor is configured to determine whether or not the short circuit or the disconnection occurs in the communication line based on a determination threshold calculated from past communication quality information.

6. The communication failure determination device according to claim 5, wherein
the processor is configured to acquire the determination threshold from a device other than the communication failure determination device including the processor.

7. The communication failure determination device according to claim 2, wherein
the processor is configured to periodically acquire the communication quality information from the communication devices.

8. The communication failure determination device according to claim 2, further comprising:
a determination terminal that includes the processor; and
a relay terminal that receives the communication quality information from the communication devices and transmits the communication quality information that is received to the determination terminal.

9. The communication failure determination device according to claim 2, wherein
the communication devices are air conditioners.

10. The communication failure determination device according to claim 1, wherein
the processor is configured to determine whether or not the short circuit or the disconnection occurs in the communication line based on the carrier-to-noise ratio, the signal intensity, or the communication speed in two or more frequency bands.

11. The communication failure determination device according to claim 10, wherein
the processor is configured to
acquire the carrier-to-noise ratio, the signal intensity, or the communication speed in each of the two or more frequency bands to obtain two or more carrier-to-noise ratios, two or more signal intensities, or two or more communication speeds,
calculate an average value of the two or more carrier-to-noise ratios, the two or more signal intensities, or the two or more communication speeds, and
determine that the short circuit or the disconnection has occurred in the communication line when the average value is smaller than a threshold value.

12. The communication failure determination device according to claim 1, wherein
the communication system includes three or more of the communication devices and two or more of the communication line, and
the processor is configured to determine whether or not the short circuit or the disconnection occurs for each of the communication lines.

13. The communication failure determination device according to claim 1, wherein
the processor is configured to determine whether or not the short circuit or the disconnection occurs in the communication line based on a determination threshold calculated from past communication quality information.

14. The communication failure determination device according to claim 13, wherein
the processor is configured to acquire the determination threshold from a device other than the communication failure determination device including the processor.

15. The communication failure determination device according to claim 1, wherein
the processor is configured to periodically acquire the communication quality information from the communication devices.

16. The communication failure determination device according to claim 1, further comprising:
a determination terminal that includes the processor; and
a relay terminal that receives the communication quality information from the communication devices and transmits the communication quality information that is received to the determination terminal.

17. The communication failure determination device according to claim 1, wherein
the communication devices are air conditioners.

18. The communication failure determination device according to claim 1, wherein
the processor is configured to determine that the short circuit or the disconnection has occurred in the communication line when the carrier-to-noise ratio, the signal intensity, or the communication speed to is smaller than a threshold value.

* * * * *